Patented Nov. 24, 1931

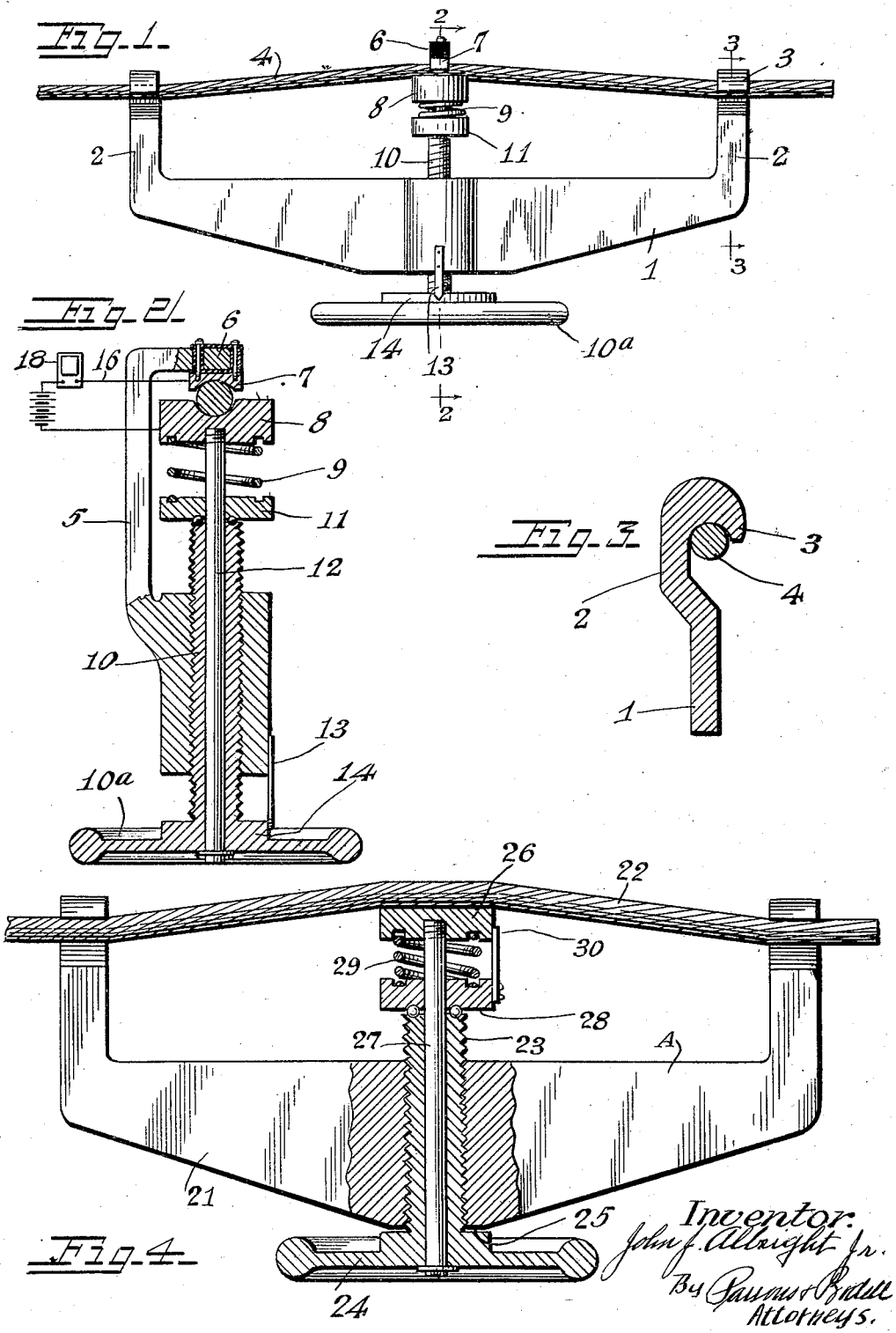

1,833,195

UNITED STATES PATENT OFFICE

JOHN J. ALBRIGHT, JR., OF HAMBURG, NEW YORK

INSTRUMENT FOR MEASURING OR COMPARING THE TENSION OF WIRES AND CABLES

Application filed May 31, 1923. Serial No. 642,722.

This invention has for its object a particularly simple and efficient instrument for measuring the tension of wires or comparing the tension of a wire with the known tension of a known wire. The invention consists in the novel features and in the combinations and constructions hereinafter set forth and claimed.

In describing this invention we have reference to the accompanying drawings in which like characters designate the corresponding parts in all the figures.

Figure 1 is an elevation of one embodiment of this instrument showing the same applied to a wire or cable being tested.

Figure 2 is an enlarged sectional view on line 2—2, Figure 1.

Figure 3 is an enlarged sectional view on line 3—3, Figure 1.

Fig. 4 is a sectional view similar to Fig. 1 of another form of my invention.

This instrument is particularly adapted to determine or compare the tensions of electric power cables and the like, after the cables have been strung or during the stringing thereof, in order that, if necessary, the tension may be varied.

This instrument for measuring or comparing the tension of wires comprises means for deflecting a portion of the wire out of its natural course and means for measuring the amount of deflection or the force required to effect such deflection, thereby forming a basis for comparison with the known tension of a known wire. It also preferably includes means for indicating when the wire is deflected, as an electroresponsive device connected in a normally open circuit which is closed by the deflection of the wire when the wire reaches a predetermined point in its deflection, and also means for indicating the amount of the deflection or the force required to effect such deflection. The illustrated embodiment of my invention comprises a body having means for deflecting the wire out of its natural course between such spaced apart points.

1 designates the body which is here shown as having angularly arranged arms 2 provided with means as hooks 3 for hooking over the wire or cable 4 at spaced apart points. In the illustrated embodiment of this instrument, the body is also shown as formed with arms 5 intermediate of the supporting arms 2 and having a fixed jaw 6 arranged out of alinement with the hooks 3 this jaw carrying a block 7 for engaging the wire.

The means for deflecting the wire against the block 7 comprises a clamp or jaw 8 opposed to the block 7 and movable toward and from the same in order to clamp the wire 4 against the block 7, this jaw 8 being pressed by a spring 9 and the jaw being operated through the spring 9.

The jaw 8 is operated through the spring 9 by means here illustrated as a threaded stem or screw 10 threading through the intermediate part of the body 1 and thrusting at one end against the spring seat or abutment 11 and having a suitable handle for a wheel 10a at its other end. The jaw 8 is also formed with a stem 12 extending axially through the spring abutment 11 and the screw 10. A suitable micrometer is associated with the handle 10a to determine the amount of movement required of the jaw 8 to deflect the wire 4 against the contact block 7 or to tension the spring 9 to effect the required movement of the jaw 8 and wire 4. This micrometer is here shown as a pointer 13 fixed to the jaw and coacting with calibrations or a scale on the hub 14 of the wheel 10a, different calibrations being required by different sizes of wires or cables. Obviously upon the turning of the wheel 10a and screw 10 a certain number of turns will be required to tension the spring 9 sufficiently to thrust the jaw 8 against the wire 4 and deflect it out of its natural course into contact with the block 7.

In order to determine when the wire 4 is deflected a predetermined amount, an electro-responsive device as a buzzer is connected in a normally broken electric circuit which is closed through the wire, when the wire has been deflected a predetermined amount that is in this embodiment of my invention when the wire has been brought against the contact block 7. The contact block 7 is insulated from the jaw 6 and one branch 16 of the circuit is connected to said block and the other branch to the jaw 8 or to the wire 4, thus when the wire has been pressed against the block 7 the circuit will be closed through the buzzer 18.

In operation, by obtaining a reading on the scale on the hub 14 from a wire of known tension, the wire under test can be compared with the known tension by placing the instrument on such wire and deflecting the portion of wire between the hooks 2 until the buzzer sounds. If the reading is now the same as before, the wires are of the same tension, if the reading is different, the tension of the wire under test can be varied.

In Figure 4 is shown another form of this instrument in which no stop or contact is used to engage the wire and limit the deflection thereof, and no electroresponsive device is employed to show when the wire is deflected a predetermined amount.

In this form of instrument shown in Figure 4, the body 21 is substantially the same as shown in the Figures 1, 2 and 3 but the deflection of the wire 22 is not limited by a stop or a fixed jaw. On the contrary movement of the prime mover or screw is limited by a fixed stop and the force required to deflect the wire to bring the prime mover against the stop, or the force required to tension a spring to deflect the wire when the prime mover is brought against the stop, is measured or indicated.

23 is the prime mover as a screw threading through the intermediate portion of the body 21 at an angle to the course of the wire. 24 is the handle as a wheel on the outer end of the screw, the hub of the wheel abutting against the body at 25 when the screw is turned to its full extent to effect the greatest deflection of the wire within the capacity of the instrument, the point 25 being a stop. 26 is a member or block which thrusts against the wire, the block preferably having a stem 27 slidably fitted in an axial bore in the screw. 28 is a block or spring abutment associated with the screw and swiveled at the inner end thereof, this abutment being opposed to the block 26. 29 is a compression spring confined between the member or the block 26 and the abutment 28, and 30 is an indicator carried by one of these parts and arranged and calibrated to indicate the amount of deflection or compression of the spring, required to deflect the wire when the handle 24 of the screw engages the stop 25.

Turning of the handle 24 compresses the spring 29 which in turn deflects the wire 22 out of its course. The amount of compression of the spring, as shown by the indicator 30 when the handle 24 is brought against the stop 25, serves as a basis for comparison with a reading taken from the instrument from a wire of known tension.

What I claim is:

1. An instrument for measuring the tension of wires comprising a body provided with means for engaging the wire at spaced apart points and with a contact between said points and out of alinement therewith, a clamping member opposed to said contact, and arranged to deflect the wire and press it against the contact, means for moving the clamping member including a spring acting against the latter, and an indicator dependent on the amount of compression of the spring necessary to deflect the wire against the contact.

2. An instrument for determining the tension of wires comprising a body provided with means for engaging the wire at spaced apart points, and means for deflecting the portion of the wire between said points, an electric circuit having an electro-responsive device therein, such circuit being normally broken and arranged to be closed through the wire when the wire is deflected a determined amount, and indicator means dependent on the force required to deflect the wire to close the circuit.

3. An instrument for measuring the tension of wires comprising a body provided with supports having means for engaging the wire at spaced apart points, a contact carried by the body between said points and out of alinement therewith and in the path of the portion of the wire between said points, when deflected out of its natural course, a clamping member opposed to the contact and operable to deflect the wire out of its normal course and press the same against the contact, an electric circuit having one branch connected to the contact and its other branch to the clamping member, an electro-responsive device in said circuit, means for moving the clamping member and an indicator for showing the amount of movement required of the operating means to press the wire against the contact and close the circuit through the electroresponsive device.

4. An instrument for measuring the tension of wires comprising a body having means for engaging the wire at spaced apart points, means for deflecting a portion of the wire between said points out of its normal course, a stop carried by the body and arranged to engage the wire to limit the deflection thereof and means for indicating the force necessary to deflect the wire against the stop, said means being dependent upon the force required to effect the deflection of the wire against the stop.

5. An instrument for measuring the tension of wires comprising a body provided with supporting means for engaging the wire at spaced apart points, a fixed contact carried by the body, means carried by the body and acting on the wire between said points to deflect the portion thereof between said points against said contact, and an indicator for showing the force required to deflect the wire into engagement with the contact.

In testimony whereof, I have hereunto signed my name, at Hamburg, in the county of Erie, and State of New York, this 7th day of May, 1923.

JOHN J. ALBRIGHT, Jr.